VEHICLE DETECTION APPARATUS

Filed May 9, 1960 5 Sheets-Sheet 1

INVENTORS
H. C. KENDALL, J. H. AUER JR.
N. A. BOLTON AND
BY K. H. FRIELINGHAUS
Forest B. Hitchcock
THEIR ATTORNEY

VEHICLE DETECTION APPARATUS

Filed May 9, 1960 5 Sheets-Sheet 2

INVENTORS
H.C.KENDALL, J.H.AUER JR.
N.A.BOLTON AND
K.H.FRIELINGHAUS
BY Forest B. Hitchcock
THEIR ATTORNEY

VEHICLE DETECTION APPARATUS

Filed May 9, 1960 5 Sheets-Sheet 3

PULSE GENERATOR

TIME CONSTANT AND
RINGING OSCILLATOR

TIME CONSTANT AND
INVERTER AMPLIFIER

ADJUSTABLE TIME CONSTANT
AND GATE GENERATOR

*INVENTORS*
H.C. KENDALL, J.H. AUER JR.
N.A. BOLTON AND
*BY* K.H. FRIELINGHAUS

Forest B. Hitchcock
THEIR ATTORNEY

FIG. 7. GATED DETECTION AND RELAY CONTROL CIRCUITS
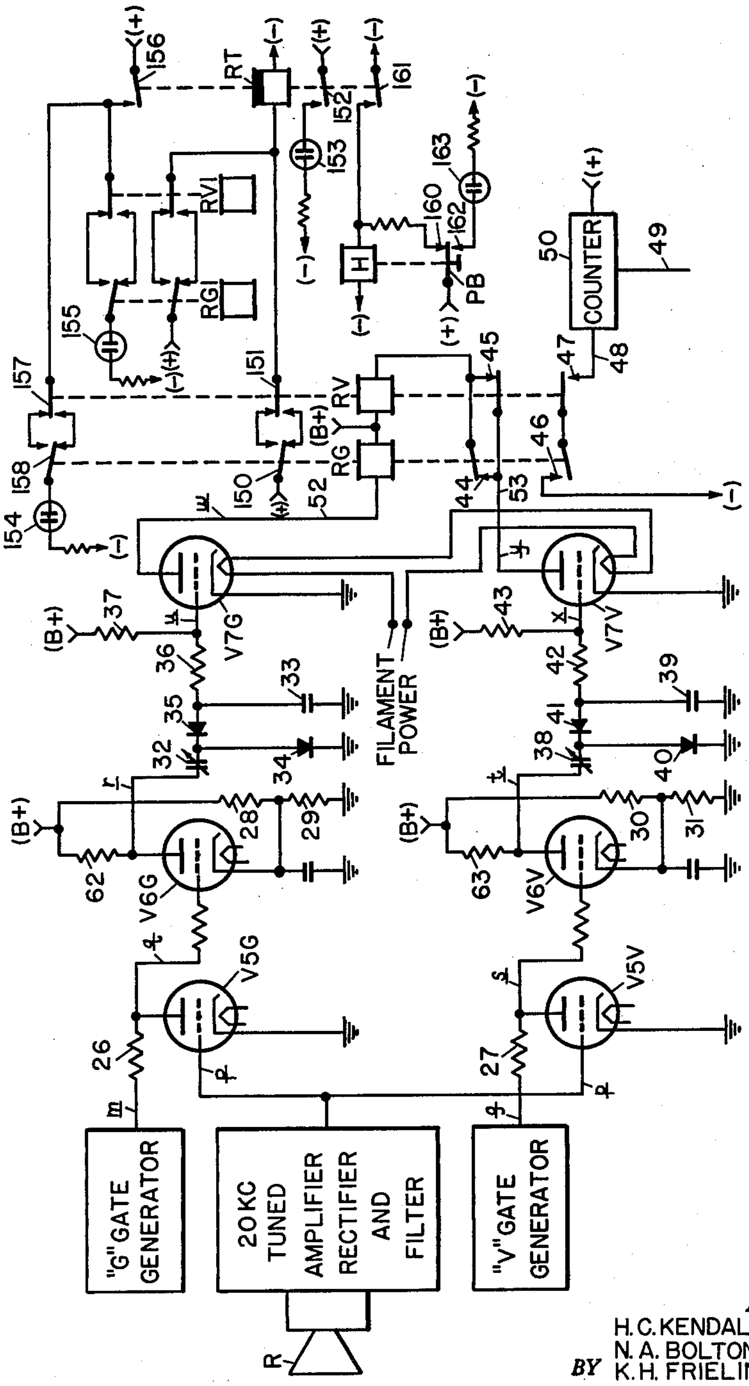
INVENTORS
H. C. KENDALL, J. H. AUER JR.
N. A. BOLTON AND
K. H. FRIELINGHAUS
BY Forest B. Hitchcock
THEIR ATTORNEY

VEHICLE DETECTION APPARATUS

Filed May 9, 1960 5 Sheets-Sheet 5

INVENTORS
H.C.KENDALL, J.H.AUER JR
N.A.BOLTON AND
K.H.FRIELINGHAUS
BY Forest B. Hitchcock
THEIR ATTORNEY United States Patent Office 3,110,008
Patented Nov. 5, 1963

3,110,008
VEHICLE DETECTION APPARATUS

Hugh C. Kendall and John H. Auer, Jr., Rochester, Norman A. Bolton, Scottsville, and Klaus H. Frielinghaus, Rochester, N.Y., assignors to General Signal Corporation, a corporation of New York Filed May 9, 1960, Ser. No. 27,806
12 Claims. (Cl. 340—38)

This invention relates to the detection of objects by means of reflected ultrasonic energy, and more particularly relates to the detection and differentiation of vehicles or other randomly occurring objects traveling along defined paths by ultrasonic detection means.

This invention is analogous in subject matter to, and the present application is a continuation-in-part of our prior copending application of H. C. Kendall et al., Ser. No. 808,736, filed April 24, 1959, now Patent No. 3,042,303 issued July 3, 1962.

In the system disclosed in such prior application, a beam of sound energy is directed across the path to be traversed by each object or vehicle. A receiver is provided which includes a sound transducer so positioned and directed that it receives and is responsive to the transmitted sound energy upon its reflection from the surface of the object or vehicle when it intercepts the transmitted sound beam. The transmitted sound beam is additionally so directed and the receiving transducer so positioned that, in the absence of any vehicle, the transmitted sound energy is alternatively reflected from a fixed reflecting surface to the receiving transducer. Such an arrangement is readily provided in one specific embodiment for the detection of vehicles by positioning both the transmitting and receiving transducers over a lane of traffic with both directed downwardly so that the transmitted sound beam is transmitted toward and reflected from the tops of passing vehicles. The receiving transducer receives reflected sound energy from the pavement when no vehicle is present and alternatively receives sound energy from the top of each passing vehicle. By means of electronic gating circuits, sound pulses reflected from surfaces nearer the transmitting transducer than the fixed reflecting surface (such as vehicle tops, for example) are detected and differentiated as is disclosed in detail in the above-mentioned Kendall et al. application.

A high degree of accuracy in object detection is achieved by the ability in these prior systems to discriminate between the desired objects or vehicles to be counted and other extraneous objects, and this is brought about, in part, by so organizing the system that a single count can be registered only by going through a complete normal cycle of events. Such cycle comprises the reception of reflections from a sound reflecting surface requiring a shorter pulse transit time between transmitting and receiving transducers than the fixed reflecting surface, the interruption of sound reflections from the fixed reflecting surface, and the re-establishment of reflections once more from such fixed reflecting surface. This last-mentioned re-establishment of reflections is indicative of the departure from the detection zone of the object or vehicle being detected and/or counted.

It is desirable in such a system to provide a checking circuit organization which will at all times indicate the proper operation of the vehicle detection apparatus. It is desirable that such a checking means provide a continuous check not only of the effectiveness of the transmitting and receiving transducers along with the sound pulse generating circuits and receiving circuits, but also of the various gating circuits that may be employed and the various relay circuits which are included and distinctively operated according to the received signal. The use of such a checking circuit will give an immediate indication of a defective condition and thereby permit repairs to be made quickly or the defective unit replaced. This is particularly important where the detector unit may be a part of an over-all system for the control of highway traffic and also where the detector unit may be used to count vehicles into and out of a particular area such as a parking garage.

The vehicle detection system includes a first electromechanical device such as a relay which is actuated only by the continued reception of sound pulses reflected from the fixed reflecting surface, and a second similar electromechanical device which is actuated only when sound pulses are received which have been reflected from a passing vehicle. It follows, therefore, that both devices are in opposite conditions relative to each other when no vehicle is present in the detection zone and are again in opposite conditions when a vehicle is present even though both devices are then in conditions opposite from their normal conditions. Generally then, both of these devices are in opposite conditions relative to each other but are both in the same condition only for very brief intervals, if at all, during the instant a vehicle is entering or leaving the detection zone, causing the devices to each be actuated to an opposite condition. As long as both devices are in relative opposite conditions, this is an indication that the system is operating properly; but if both remain for an unduly long time in the same condition, this is an indication of a defective condition and, under such circumstances, a check device is operated to give a distinctive indication of the existence of such condition.

It is an object of this invention to provide a system for the detection of vehicles or other objects by means of the effects produced by the passage of such vehicles as each intercepts a beam of sound pulses wherein a check circuit is employed which provides a distinctive indication in the event of any defect in the detecting apparatus.

It is another object of this invention to provide a vehicle detection system wherein an indication is given of the presence of a defective condition and, where the checking means is common to a plurality of such vehicle detection means, a distinctive indication is also given of the location of the source of any such defect.

Other objects, purposes, and characteristic features of the present invention will in part be obvious from the accompanying drawings and in part pointed out as the description of the invention progresses.

To simplify the illustrations and facilitate in the explanation of this invention, various parts and circuits which constitute the embodiment of the invention are shown diagrammatically and certain conventional circuit organizations are disclosed in block form since the drawings have been made more with the purpose of making it easy to understand the principles and mode of operation than to illustrate the specific construction and arrangement of parts that might be used in practice. The symbols (B+) and (B−) are used to indicate the positive and negative terminals, respectively, of a source of direct current suitable for the energization of various electron tubes and having an intermediate terminal represented by the symbol for a ground connection. The symbols (+) and (−) indicate connections to the positive and negative terminals, respectively, of a source of lower voltage suitable for the operation of various relays and the like.

In describing the invention in detail, reference will be made to the accompanying drawings in which like reference characters designate corresponding parts throughout the several views and in which:

FIG. 7 is a circuit diagram illustrating the gated detection and relay control circuits of this invention including the check circuit;

Figure 1A:
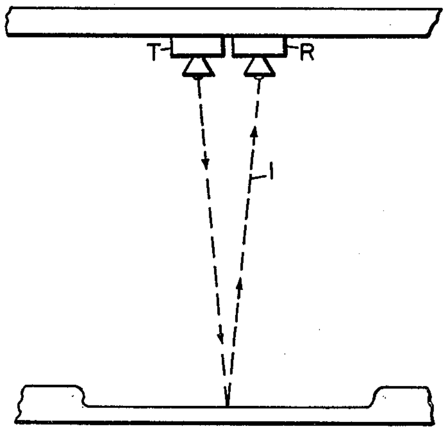
FIGS. 1A and 1B illustrates a possible arrangement of the receiving and transmitting transducers in relation to the vehicles to be detected.
Figure 1B:
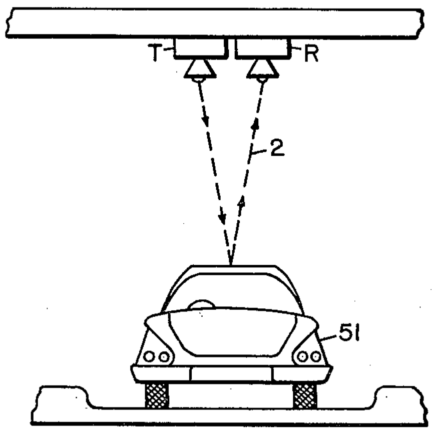

With reference to FIGS. 1A and 1B, two ultrasonic transducers, T and R, respectively, are shown as they might appear when mounted over the detection lane, either entrance or exit, of a parking garage or some other type of passage way. Such two transducers may similarly be mounted over the roadway on a horizontal mast affixed to a vertical post positioned to the edge of the roadway.

When there is no vehicle present, as in FIG. 1A, the repetitive sound pulses which emanate from the transmitting transducer T are reflected from a fixed reflecting surface which in this case comprises the pavement, and after reflection, these sound waves 1 are, in part, picked up by the transducer R. When a vehicle 51 passes through the detection area or zone as shown in FIG. 1B, it cuts off the normally present reflected ground or pavement pulses and the receiving transducer R then receives instead reflections of sound pulses from the top of the vehicle.

As mentioned above, various electronic gating circuits are used to make it possible for the receiving circuits associated with the receiving transducer R to distinguish the reflected sound received from the vehicle 51 from the reflected sound received ordinarily from the fixed reflecting surface of the pavement. This can be accomplished because the transmitted sound is in the form of discrete pulses of sound energy, and each pulse has a known time of transmission from the transmitting transducer T, to the pavement, and back to the receiving transducer R. The transit time of each sound pulse is, of course, much less when the vehicle is present since each sound pulse is then reflected instead from the uppermost surfaces of such vehicle. In the preferred form of the invention as disclosed in the prior Kendall et al. application previously mentioned, the detection of a vehicle results not only from the reception of reflected sound pulses from the top of such vehicle as in FIG. 1B, but also from the termination of the normal reflected pavement pulses, and the apparatus is restored to normal to permit the counting of a subsequent vehicle only when reflected sound pulses are once again received by the receiving transducer R from the pavement.

Figure 8B:
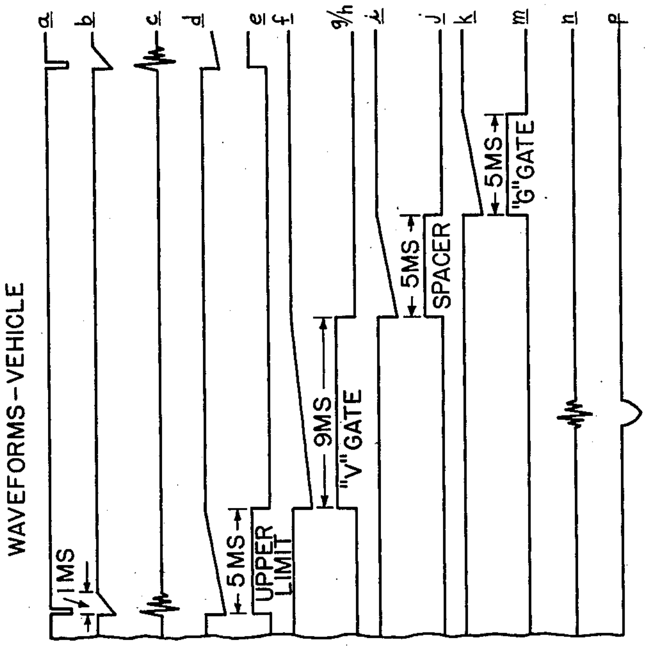
FIGS. 8A and 8B are typical waveform diagrams of voltages that may be found at various points in the overall circuit illustrated in FIG. 2, particularly showing the use of electronic gating circuits to selectively differentiate between reflected pulses of ultrasonic energy.

In describing the circuit organization used in one specific embodiment of the invention as applied to the detection of vehicles entering and leaving a parking garage, reference will be made to the block diagram of FIG. 2, to the detailed circuits shown in FIGS. 3–9, and to the waveforms illustrated in FIGS. 8A and 8B.

Figure 2:
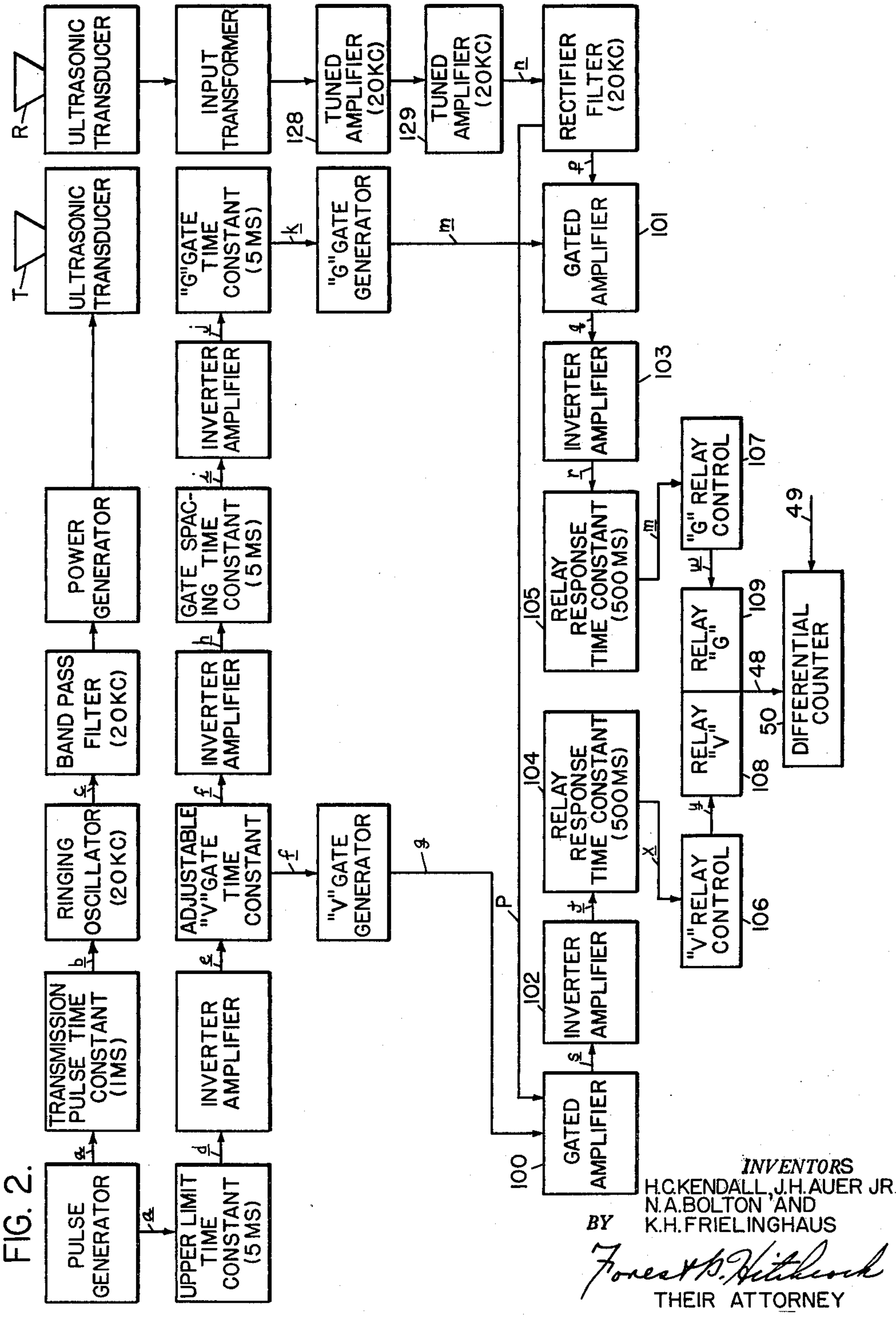
FIG. 2 is a block diagram of the detailed circuits of the vehicle detection system of this invention.
Figure 3:
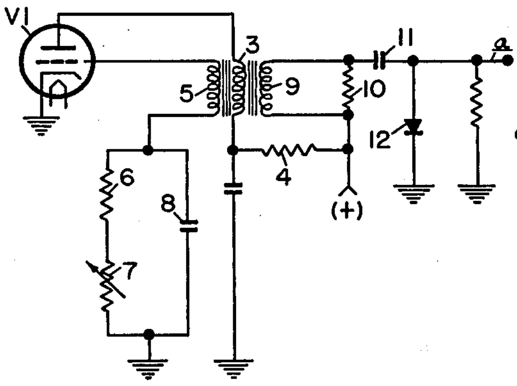
FIGS. 3–6 are schematic diagrams of typical electronic apparatus that may be used for the various circuits illustrated in block diagram form in FIG. 2.

The Pulse Generator of FIG. 2 may comprise a single-swing blocking oscillator of the kind shown in FIG. 3. The operation of such a blocking oscillator is well-known in the art and is, moreover, described in considerable detail in both of the prior applications referred to previously so that it is deemed unnecessary to provide further details of its operation. It will suffice to say that the operation of the circuit is such that negative-going voltage pulses appear periodically at the output terminal *a*, and the repetition rate of these pulses is determined by the values of the various circuit components employed. In general, it may be said that the repetition rate of this blocking oscillator is selected so that the interval between successive pulses will be at least as long as the transit time from the transmitting transducer to the fixed reflecting surface and back to the receiving transducer. In this way, each reflected pulse produced in response to a particular transmitted pulse is received by the receiving transducer prior to the transmission of the next pulse from the transmitting transducer.

The negative-going trigger pulses produced by the Pulse Generator are fed to the Transmission Pulse Time Constant which, in turn, controls the operation of the ultrasonic frequency Ringing Oscillator. In this connection, although the term "ultrasonic" refers to all wave motion produced by physical vibration as distinguished from electromagnetic waves, and is generally considered to occur at frequencies above the range of audibility, i.e., from 15,000 to 20,000 cycles per second and higher, the teachings of this invention are not to be limited to such values since they may as well be in the audible range of frequencies. For convenience in disclosing the present invention, however, the apparatus of this invention has been arbitrarily shown as designed to operate at a frequency of 20 kc.

The function of the Transmission Pulse Time Constant is to set the Ringing Oscillator into oscillation for a short predetermined time interval in response to each output pulse of the Pulse Generator. As indicated in FIG. 2, in one embodiment of this invention the circuits were organized to cause the Ringing Oscillator to be operative or a time of one millisecond each time that the Pulse Generator gave its output pulse.

Figure 4:
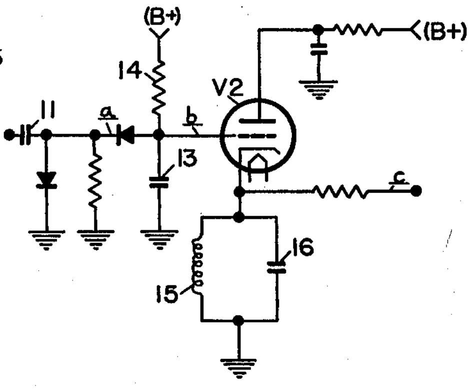
Figure 5:
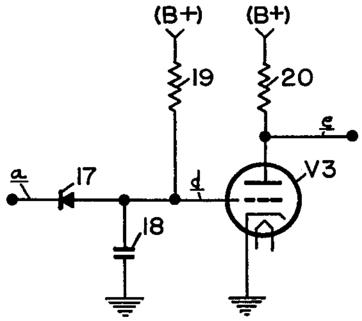

Referring to FIG. 4, each output pulse of the Pulse Generator appearing at point *a* negatively charges capacitor 13, and this capacitor can be discharged only through resistor 14. The time constant of the discharge circuit is selected to cause the grid voltage of tube V2 to remain below cutoff for the preselected one millisecond interval in the manner shown by the corresponding waveform *b* of FIG. 8A.

Triode tube V2 is normally fully conductive since its grid is connected to the (B+) terminal through resistor 14. When this tube becomes cut off for the one millisecond interval, there is a ringing effect produced in the tuned cathode circuit comprising conductor 15 and capacitor 16 whose values are selected so that oscillation will occur substantially at the desired 20 kc. frequency. At the end of the one millisecond interval, tube V2 becomes conductive again, and the oscillatory waveform of voltage across the cathode load impedance is abruptly terminated. The output of this oscillatory circuit, represented by waveform *c* in FIG. 8A, is then applied through the Band-Pass Filter of FIG. 2 and also through the Power Amplifier to the ultrasonic transducer T which responds to this one millisecond waveform of 20 kc. energy by providing a corresponding one millisecond pulse of 20 kc. ultrasonic energy. This output of the transducer T is directed, in the organization of the invention illustrated in FIGS. 1A and 1B, toward the pavement over which pass the vehicles to be detected.

GATE TIMING CIRCUITS

Each negative-going trigger pulse provided by the Pulse Generator on its output terminal *a* is also used to trigger the operation of the various gate timing circuits shown in the second line of blocks in FIG. 2. The combination of Time Constant circuits and Inverter Amplifiers that make up this portion of the overall circuit comprises a consecutive series of circuits of the kind generally illustrated in FIG. 5, the output of each Inverter Amplifier being used to trigger the next succeeding Time Constant. More specifically, each negative-going trigger pulse appearing at point *a* negatively charges capacitor 18 through rectifier 17, thereby rendering the normally conductive triode tube V3 nonconductive for a time interval determined by the Time Constant for the discharge of capacitor 18 through resistor 19. The first Time Constant circuit, designated as the Upper Limit Time Constant is organized to cut off the triode tube V3 for a period of five milliseconds each time that capacitor 18 becomes negatively charged by a trigger pulse at terminal *a*. The voltage waveforms appearing at terminals *d* and *e* of this timing circuit are illustrated by the respective waveforms *d* and *e* of FIG. 8A. This Upper Limit Time Constant determines the maximum height of vehicles that can be detected by the apparatus as will be more fully explained hereafter.

Figure 6:
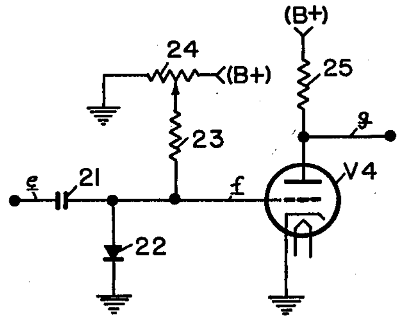

The output voltage of this first Inverter Amplifier is applied to the input of the adjustable "V" Gate Time Constant, the detailed circuit of which is shown in FIG. 6. When the voltage at point *e* rises during the positive-going portion of the above-described square wave, diode 22 conducts, thereby permitting capacitor 21 to charge through a low time constant charging circuit. At such time, the grid potential of tube V4 remains substantially at the level of the ground cathode. However, when the voltage of point *e* goes abruptly negative at the trailing edge of the square wave, this negative-going drop produces a voltage drop also at the grid of tube V4 which immediately cuts off the diode 22 and also prevents any conduction between the grid and cathode of this tube due to diode action. There is thus only a long time-constant discharge circuit for capacitor 21 and this is provided by resistor 23 and potentiometer 24. By moving the tap to the right, closer to the (B+) terminal, the voltage towards which capacitor 21 discharges may be increased, thereby causing capacitor 21 to lose its negative charge more rapidly and thereby, in turn, controlling the period during which triode tube V4 remains cut off. For purposes of this disclosure, the circuit values are selected so that triode V4 will remain cut off for a period of about nine milliseconds as shown by waveforms *f* and *g* of FIG. 8A. Waveform *f* illustrates the grid voltage, and waveform *g* the substantially square wave of plate voltage which is provided during the time tube V4 is cut off.

Referring again to FIG. 2, the output of the Adjustable "V" Gate Time Constant is applied also to an Inverter Amplifier which provides an output as shown at line *h*. This voltage is applied to the Gate Spacing Time Constant. This latter circuit corresponds to that shown in FIG. 5 and responds to the negative-going voltage variation occurring at the trailing edge of the nine millisecond gate (see line *h* of FIG. 7A) by providing a spacing gate which, as indicated by lines *i* and *j* of FIG. 8A, is of approximately five milliseconds duration.

Finally, the trailing edge of the square wave of voltage at terminal *j* again triggers another time constant circuit which is designated at FIG. 2 as the "G" Gate Time Constant which, together with its associated "G" Gate Generator may also take the form of the circuit shown in FIG. 6. More specifically, the negative-going trailing edge of the pulse shown in line *j* of FIG. 8A initiates operation of the timing circuit to provide a positive gating pulse, as indicated at lines *k* and *m* of FIG. 8A, which is of five milliseconds duration.

With respect to the various time intervals demarcated by the various timing circuits, it will be sufficient to observe that the various timing circuits are so adjusted that the "G" gate encompasses that partcular interval of time following the transmission of each sound pulse during which a reflection is expected to be received, in the absence of a vehicle, from the ground or pavement. In a similar manner, the "V" gate illustrated in line *g* of FIG. 8A encompasses that portion of time within which a reflected pulse from a vehicle would be expected at the receiving transducer R. Of course, the particular time intervals are primarily a function of the geometry of the particular situation since the spacing of the transducers above the highway will be the determining factor as to the time interval between the transmission of sound pulse and the occurrence of the "G" gate for the reason that it is this dimension which determines the transit time of each sound pulse from the transmitting transducer to the pavement or ground and back to the receiving transducer.

Figure 8A:
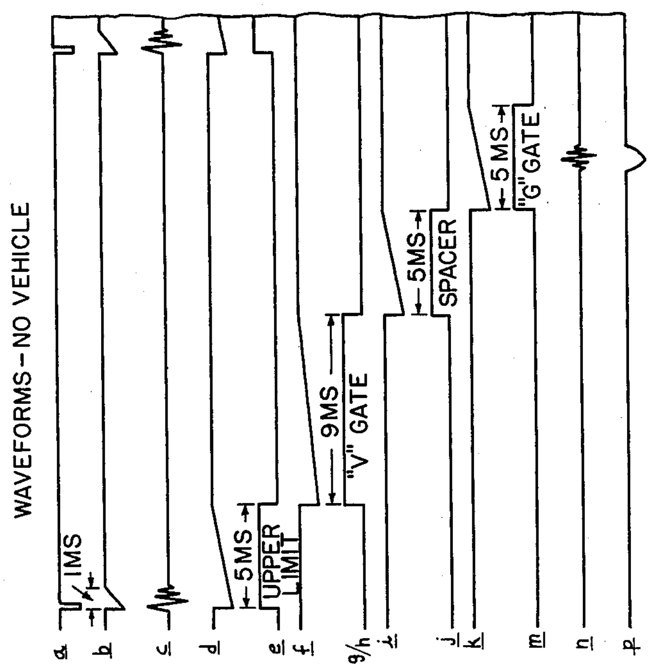

FIG. 8A shows that the "V" gate is of considerably greater length than the "G" gate, and the reason for this is that the distance from the transducers to the pavement is fixed so that there is a known and constant pulse propagation time when no vehicle is present, but when a vehicle is present the distance between the transducers and the top of the vehicle will vary in accordance with the height of the vehicle and the longer length of the "V" gate permits considerable variation in this propagation time for the vehicle reflected pulses.

As shown in FIG. 8A, the "V" gate shown in line *g* does not start with the time of transmission of the sound pulses but starts instead at a later time which, as specifically shown in FIG. 8A, is later by the five millisecond interval which is demarcated by the Upper Limit Time Constant. It is desirable that the "V" gate be ineffective during this preliminary interval so that the receiver will not receive a spurious signal which could not possibly be a vehicle reflection signal.

In the foregoing description, attention has been directed to the waveforms appearing in FIG. 8A which illustrate the operation of the circuits when there is no vehicle present within the detection zone. On the other hand, FIG. 8B illustrates the circuit operation when a vehicle is present. Referring to lines *n* and *p* of FIG. 8B and comparing these with the corresponding waveforms of FIG. 8A, it will be seen that with the vehicle present, there is no longer any received reflection from the pavement so that there is no 20 k.c. signal amplified in the receiver at the time the "G" gate is in effect. Instead, sound pulses are now reflected from the top of the passing vehicle and are thus received sooner by the receiving transducer and are, in effect, received by the receiving transducer R during the existence of the "V" gate.

REFLECTED WAVE RECEPTION AND DETECTION SYSTEM

Each pulse of sound energy beamed from the transmitting transducer T and striking either the pavement or some other reflected surface is reflected back to the receiving transducer R where it is converted to a week electrical signal of 20 k.c. frequency. The voltage of this weak signal is first increased by an Input Transformer and is then amplified twice by two successive tuned amplifiers 128 and 129. The output of the second tuned amplifier 129, which is illustrated in waveform *n* of FIG. 8A, is passed through a Rectifier-Filter circuit which feeds the resulting negative pulse, corresponding to waveform *p* in FIG. 8A, to the gated detection circuits comprising Gated Amplifiers 100 and 101, Inverter Amplifiers 102 and 103, Relay Response Time Constant circuits 104 and 105, the "V" Relay Control 106, the "G" Relay Control 107, and the respective "V" and "G" relays 108 and and 109 which together control the Counter 50.

From the above description, it is apparent that the Gated Amplifiers 100 and 101 each receive an input pulse from the Rectifier-Filter for each reflection pulse picked up by the receiving transducer R, irrespective of whether the received sound pulse has been reflected from the ground or from a vehicle or other object to be detected. However, these two Gated Amplifiers 100 and 101 are gated, respectively, from the "V" Gate Generator and the "G" Gate Generator. The gating thus provided is such that either of these amplifiers can produce an output pulse in response to an input pulse from the Rectifier-Filter only if it is at that time also gated by its respective "V" Gate Generator or "G" Gate Generator. It follows from this, therefore, that the Gated Amplifier 100 will supply an output pulse to the Relay Response Time Constant 104 only when the "V" Gate Generator is providing its high level of gating voltage as indicated at line *g* of FIG. 8A. This means that such output pulse is provided only in response to a pulse reflected from the top of a passing vehicle. In a similar manner, the Gated Amplifier 101 provides an output pulse to its Relay Response Time Constant 105 only for an input pulse received from the Rectifier-Filter at the time that the "G" Gate Generator is providing its high level of output, and this means that such output pulse is provided only for a sound pulse that is reflected from the ground or pavement.

Referring now to FIG. 7 for the detailed circuits involved, each negative pulse (waveform *p* in FIG. 8A) corresponding to each reflected pulse of ultrasonic energy received by transducer R, is fed simultaneously to the grids of Gated Amplifier triodes V5G and V5V. The plates of these gating triodes are directly connected, through plate resistors 26 and 27, to the plates of their respective Gate Generators (see FIG. 6). Thus, Gated Amplifier triodes V5G and V5V pass effective plate current only during the periods when a high positive potential is placed upon their plates due to the cutting off of their respective Gate Generators (see waveforms *g* and *m* in FIG. 8A).

Assuming that a negative pulse appears at the grid of Gated Amplifier triode V5G at a time when this tube is conducting, Gated Amplifier triode V5G will be momentarily cut-off. During this momentary cut-off period, the voltage drop across plate resistor 26 will disappear, and the voltage at the plate of Gated Amplifier triode V5G will momentarily rise to a high positive potential determined by the square wave output of the "G" Gate Generator. As the result of this, a positive pulse is produced at point *q* and at the grid of Inverter Amplifier triode V6G.

On the other hand, if a negative pulse appears at the grid of Gated Amplifier triode V5G during the time it is cut-off due to insufficient plate potential, this negative pulse will not cause any noticeable change in output voltage at point *q* or at the grid of Inverter Amplifier triode V6G.

The description just set forth above of the operation of Gated Amplifier triode V5G also applies to the operation of Gated Amplifier triode V5V, the appearance of a negative pulse at point *p* producing a positive pulse at point *s* and the grid of Inverter Amplifier triode V6V only when Gated Amplifier triode V5V has a positive plate potential obtained from the "V" Gate Generator.

Because of the operation of the timing circuits described above, Gate Amplifier triodes V5G and V5V are "gated" at different times. Thus, for any given negative pulse appearing simultaneously at their respective grids, only one of the gated triodes can pass a positive pulse to the grid of the following Inverter Amplifier triode.

In spite of the positive potential appearing on their grids, Inverter Amplifier triodes V6G and V6V are normally cut-off due to the positive biasing of their cathodes by means of voltage dividers comprising resistors 28, 29 and 30, 31, respectively. However, any increase in positive potential at the grids of triodes V6G or V6V will overcome this cathode bias and cause these tubes to conduct. Thus each positive pulse produced by Gated Amplifier triode V5G or V5V at the grid of the respective Inverter Amplifier triod V6G or V6V will cause the latter to conduct, causing a sudden voltage drop across plate resistor 62 or 63. This results in the production of a negative pulse at point *r* or point *t* each time one or the other of the Gated Amplifier triodes responds to a reflected pulse signal.

As can be seen from the above description, each pulse of reflected ultrasonic energy received by transducer R during the time interval when the "G" gate is "on" (waveform *m* in FIG. 8A) results in the production of a negative pulse at point *r*. Similarly, each pulse of reflected ultrasonic energy received by transducer R during the time interval when the "V" gate is "on" (waveform *g* in FIG 8B) results in the production of a negative pulse at point *t*.

When the voltage at point *r* drops suddenly, this drop places a negative charge across both variable coupling capacitor 32 and capacitor 33, since diode 34 appears as an open circuit in response to this negative voltage, but diode 35 conducts. While the size of the drop appearing at point *r* is fairly constant, the relative proportion of this voltage drop appearing over capacitors 32 and 33, respectively, is dependent upon their relative size. That is, as capacitor 32 is made smaller relative to capacitor 33, a larger proportion of the overall voltage drop appears across capacitor 32, and, respectively, a smaller proportion of the overall voltage drop appears across capacitor 33. This adjustment is considered further below.

When the voltage at point *r* rises again to its normal level, this positive-going voltage change tries to pass through coupling capacitor 32. However, diode 35 now becomes nonconductive in response to this change, while diode 34 conducts, maintaining around potential at the right-hand terminal of capacitor 32. At the same time, the negative charge on capacitor 33 begins to discharge through resistors 36 and 37. When the invention herein is being used in the manner presently under discussion (that is, as a vehicle detector and counter in a parking garage), the values for capacitor 33 and resistors 36 and 37 are chosen so that their RC time constant is ten to twenty times longer than the pulse repetition rate of the Pulse Generator (waveform *a* in FIG. 8A).

Also, in the form presently being described, capacitor 32 should be enough smaller than capacitor 33 to require about 10 successive negative pulses at point *r* in order to build up the negative charge on capacitor 33 to a level sufficient to cut-off Relay Control triode V7G. When the grid of triode V7G is driven below cut-off and no plate current is being conducted through line 52, relay RG will drop away; and, conversely, when relay control triode V7G is conducting, current passes through line 52, the windings of relay RG to (B+), and relay RG picks up.

Similarly, a succession of negative pulses appearing at point *t* will build up a negative potential over capacitor 39, the effect of capacitor 38 and diodes 40 and 41 being the same as that just described above. The negative charge on capacitor 39, which leaks off slowly through resistors 42 and 43, determines the conduction of Relay Control triode V7V. When Relay Control triode V7V is conducting, its plate current passes through line 53, through either back contact 44 of relay RG or front contact 45 of relay RV and through the winding of relay RV to (B+), thus maintaining RV in its picked up position. Conversely, when the negative voltage at the grid of triode V7V is sufficient to cut it off, the loss of its plate current causes relay RV to drop away.

Although relay RG picks up whenever "G" Relay Control triode V7G conducts, relay RV, when once dropped away, opens the plate circuit of triode V7V at front contact 45 and tube V7V can only conduct again to pick up relay RV if relay RG first is dropped away to thereby close its plate circuit at back contact 44.

Also, when relay RG is picked up, closing front contact 46, and relay RV is dropped away closing back contact 47, a circuit is completed from ground through front contact 46, back contact 47, and line 48 to counter 50.

*Operation of Vehicle Detector and Counter*

Referring once again to FIGS. 1A and 1B, it is assumed that transducers T and R are mounted ten feet above the floor of the traffic lane which is being monitored. To avoid the unnecessary use of small fractions, the speed of sound will be considered to be the close approximation of 1,000 feet per second, or, as is more pertinent to this disclosure, one foot per millisecond. Since the transit time required for each pulse of ultrasonic energy transmitted by transducer T to reach the floor and be reflected to transducer R is approximately twenty milliseconds, and assuming also that vehicle 51 in FIG. 1B is five feet high, each pulse of ultrasonic energy reflected from the top of vehicle 51 is received at transducer R approximately ten milliseconds after its transmission from transducer T.

Under normal conditions, the Pulse Generator is adjusted for a pulse repetition rate of about thirty pulses per second. (This adjustment is made, as explained above, by adjusting potentiometer 7 in FIG. 3.) At this rate, a pulse is transmitted by transducer T every 33 milliseconds, and, when no vehicle is present in the detection lane, a reflected pulse is received at transducer R approximately twenty milliseconds after each transmission.

Referring now to FIG. 8A, during the twenty millisecond lapse between the transmission of a pulse and the reception of its reflection (*n*) from the floor, the timing circuits have marked off the five millisecond Upper Limit, the nine millisecond "V" Gate, the five millisecond Spacer, and approximately one millisecond of the five millisecond "G" Gate. Thus, the reflected ground wave appears at the grids of Gated Amplifier triodes V5G and V5V (FIG. 7) at a time when triode V5V is cut-off and triode V5G is conducting, resulting in a negative pulse at point *r* but no change in potential at point *t*. As long as no vehicle is present, the negative pulses appear at point *r* thirty times each second, and, as explained above and shown in FIG. 8C, this results in the cutting off of Relay Control triode V7G, causing relay RG to remain dropped away. At the same time, no negative pulses are appearing at point *t*, and Relay Control triode V7V is not cut-off so that relay RV is maintained in its picked-up position.

As soon as vehicle 51 appears in the detection lane (FIG. 1B), the floor reflection is cut-off, and transducer R now receives a reflection instead from the top of vehicle 51. As can be seen from FIG. 8B, this new reflection (*n*) is received approximately ten milliseconds after each transmission and arrives during the "V" Gate period marked off by the timing circuits. This results in the production of a series of negative pulses at point *t* (FIG. 7) which charge capacitor 39, cutting off Relay Control triode V7V, and, in turn, causing relay RV to drop away. At the same time, the reflected pulses (*n*) appear at the grid of gating triode V7G at a time when it is rendered ineffective due to lack of plate potential. Thus, the negative pulses which were maintaining the cut-off potential on the grid of Relay Control triode V7G disappear, and capacitor 33 discharges, permitting triode V7G to conduct and pick up relay RG.

Therefore, with the passage of a vehicle through the detection lane, relay RG picks up, closing front contact 46 (FIG. 7), and relay RV drops away, closing back contact 47, so that a circuit is completed to counter 50.

After the vehicle has passed, the transmitted pulses are once again reflected from the floor and received during the "G" Gate time period, and the circuit returns to its normal status with relay RG dropped away and relay RV picked up.

A pulse reflected in less than five milliseconds and appearing during the Upper Limit period does not cause a response in either of the gating circuits, since both gating triodes are without effective plate potential at this time. Also, the same is true of reflected pulses received between fourteen and nineteen milliseconds after transmission time, that is, during the Gate Spacer period. Due to the effect of these non-responsive periods, vehicles higher than seven and one half feet, that is, within two and one half feet of the transducers (less than five millisecond transit time for each pulse), and lower than three feet, that is, more than seven feet from the transducers (pulse transit time greater than fourteen milliseconds), will not be detected by the apparatus. These limits have been arrived at arbitrarily, and it should be obvious that they can be varied merely by varying the particular time constants involved.

*Special Features of Detection Circuit*

(a) DISCRIMINATION OF PERSONS, ANIMALS AND BIRDS

One of the problems presented by many of the presently utilized vehicle detection devices is that they are responsive to persons and animals as well as vehicles. This problem is particularly vexing in places such as parking garages where there is considerable pedestrian traffic, and even some animal traffic, along with the vehicular traffic being monitored. The invention herein overcomes this problem in part merely by its very nature, because the clothing and hair of humans and the fur and feathers of animals and birds absorb rather than reflect the pulses of ultrasonic energy beamed into the traffic detection lane. Also, the area covered by a person is generally much smaller than the floor area which reflects the transmitted beam of ultrasonic energy, and thus, the presence of a person in the detection area generally does not cut-off the normal ground reflection. However, the invention herein does not rely solely on these phenomena, since some people passing through the detection zone may be carrying packages or wearing hard objects which will reflect some ultrasonic energy as they walk by.

Assuming that persons carrying or wearing reflective objects succeed in cuttting off the normal ground reflection, they are still distinguished from vehicles by this invention either on the basis of the short time, relative to vehicles, required for them to pass through the detection zone, or on the basis of the sporadic nature of the reflections received from them.

(b) CONVERTIBLE (FABRIC TOP) COMPENSATION

While the fact that certain materials absorb rather than reflect ultrasonic energy helps to assure that people and animals will be distinguished from vehicles by this invention, this same fact raises a particular problem in the case of convertibles and other vehicles with fabric tops which absorb the ultrasonic energy transmitted from transducer T. As a convertible begins its passage through the detection zone, the "V" Gate passes a series of reflections from the hood. When the fabric top passes beneath the detection zone, the reflections are lost, but they are received once again from the trunk section of the car. When the reflections are lost during the passage of the fabric top, capacitor 39 discharges and allows the voltage at the grid of Relay Control triode V7V to rise above cut-off. This would normally result in the conductivity of triode V7V and the picking of relay RV.

However, as explained above, once relay RV is dropped away, it can only be picked up again if relay RG is dropped away. However, due to the loss of ground reflections during the entire passage of the convertible auto, capacitor 33 discharges and the voltage at the grid of Relay Control triode V7G remains above cut-off. Thus, triode V7G conducts steady plate current and relay RG remains picked up until the convertible has passed and cut-off potential has once more been built up at the grid of triode of V7G. When triode V7G is cut-off once more, relay RG drops away closing back contact 44 and allowing relay RV to be picked up again, and the circuit returns to its normal state.

The circuitry just described assures that any single vehicle will only be detected once, that is, it will cause only one impulse to be sent to counter 50, even though during a single passage through the detection zone more than one separate and distinct set of reflected pulses is received by transducer R.

CHECK CIRCUIT

The check circuit organization previously referred to in general terms includes, among other components, an electromechanical device represented in the specific embodiment of FIG. 7 as being a relay having slow pickup characteristics. This relay is energized through a circuit which includes contacts of the relays RG and RV. Normally, as will presently be described, the relay RT is dropped away, but when an abnormal condition exists for a predetermined time interval, relay RT is picked up and a distinctive indication given of the existence of a faulty condition.

As shown in FIG. 7, relay RT is provided with a pick-up circuit which includes, alternatively, front contacts 150 and 151 of relays RG and RV, respectively, and also the same back contacts in series. From the description previously given, it is evident that relay RV is normally in a picked-up condition since there are normally no vehicle reflection pulses received which can cause it to become dropped away. On the other hand, relay RG is normally dropped away because the normal occurrence of pavement or ground reflections results in the deenergization of its winding. Normally, therefore, front contact 150 of relay RG is open as is also the back contact 151 of relay RV so that neither of the alternative pick-up circuits for relay RT is closed. In a similar manner, whenever a vehicle is present, the conditions of both relays RG and RV are reversed in that relay RV is then dropped away by the continued reception of vehicle reflection pulses while relay RG is then picked up due to the lack of the normal pavement reflections. It will be obvious from the circuits shown that the pick up circuit for relay RT is then again not completed.

Under the normal mode of operation, relay RG and relay RV may not operate simultaneously to their opposite conditions in response to the passage of a vehicle. In that event, the situation may momentarily exist that relays RG and RV are both simultaneously picked up or both simultaneously dropped away, in which event a pick up circuit may be momentarily closed for the energization of relay RT. However, the very slow pick-up characteristics of this relay, which may be so constructed as to require steady energization of perhaps two minutes or more before it will pick up, precludes any operation of this relay due to such momentary closure of its pick-up circuit.

If, on the other hand, a faulty condition exists so that relay RG will not normally become dropped away or such that relay RV will not normally pick up, then the pick-up circuit for relay RT will be closed for a longer time and this will eventually cause relay RT to pick up.

When relay RT picks up, it closes its front contact 152 to thereby energize an indicator lamp which may be of the neon type, and this provides an indication of a defect in one of the vehicle detection units. Preferably, the neon indicator lamps will be energized from an independent source of power or at least from a transformer different from that used to power the rest of the equipment. This insures that a visual indication of a fault will be given in the event that power to the equipment fails so that both relays RG and RV are dropped away.

Ordinarily, in a system where such vehicle detection units are used, there may be a considerable number of such units, in which event a single relay RT will be employed and controlled jointly by the various detector units associated therewith. This is shown in FIG. 7 by the alternative circuit for the control of relay RT which includes contacts of the relays RG1 and RV1 which, it is assumed, are associated with another vehicle detection unit and correspond to the relays RG and RV which are particularly associated with the detection unit whose detailed circuit is shown in this FIG. 7. It will be apparent from the description given, that any faulty condition with respect to such other unit causing its relays RG1 and RV1 to be in the same operated condition for any appreciable length of time will also result in the picking up of relay RT.

The resulting illumination of the indicator lamp 153, while providing an indication of a defective condition, does not by itself indicate with respect to which unit the defective condition has occurred. To provide this, it is desirable to include a separate indication circuit for each individual detector unit. Thus, an indicator lamp 154 if provided to indicate that a defective condition exists with respect to the principal vehicle detector unit shown in detail in FIG. 7. A similar indicator lamp 155 will indicate by its illumination that a defective condition exists with respect to the other similar detector unit having the corresponding relays RG1 and RV1. More specifically, assuming that a fault has occurred such that relay RG cannot be dropped away in response to the normally received ground reflection pulses, this will eventually result in the energization of relay RT through an obvious circuit including front contacts 150 and 151. When this happens, the front contact 156 of relay RT will close and energy will then be applied through the front contacts 157 and 158 of relays RV and RG, respectively, to energize the lamp 154. Obviously, a defect with respect to the other indicator unit would cause energy to be applied through front contact 156 and through the coresponding contacts of relays RG1 nad RV1 to energize the corresponding indicator lamp 155.

A defective condition resulting in the actuation of slow pick-up relay RT may not persist, in which event relay RT will be restored to its normal condition. Under such circumstances, it is nevertheless desirable that some indication be retained thereafter to inform one that there has been a defect in the past even though it has, for the time being at least, disappeared. To provide this, a pushbutton PB of the magnetic hold type having an associated holding magnet H is provided. When this pushbutton is manually operated so as to close its front contact 160, the hold magnet is energized thereby maintaining this front contact 160 closed. However, if at any time, a defect should occur causing relay RT to pick up, the resultant closure of front contact 161 will shunt the winding of the hold magnet H, thereby causing back contact 162 to close. Because of this, neon lamp 163 will be illuminated and give a visual indication that there has been some defect in the system, and this lamp 163 will remain illuminated even if relay RT should later drop away since contact 162 can open only by manual actuation of the pushbutton PB.

From the description which has been given of the mode of operation of the vehicle detection system of this invention and particularly of the check circuit, it will be understood that the check circuit provides a continual check over the operation of a considerable portion of the apparatus of the invention. More specifically, any defect in the system which makes it impossible for relay RG of FIG. 7 to be dropped away by the reception of sound pulse reflections from the fixed reflecting surface will produce a distinctive indication of such defect for, under such circumstances, the relays RG and RV will then both be picked up. Such a condition may come about as a result of any of a number of different conditions such as a fault in the Gate Generator, Oscillator, Power Generator, or transmitting transducer T, any of which will make it impossible for the sound pulses to be transmitted. Similarly, any defect in the ultrasonic transducer R provided for the reception of sound pulses or in any of the receiver circuits will make it impossible to respond to reflections from the pavement.

The generation of pulses which can cut off tube V7G and thereby normally drop away relay RG is also dependent upon the proper operation of the various gate generating circuits. As pointed out previously, negative trigger pulses can be generated at the plate of tube V6G only if the received pavement pulses occur during the time of the "G" gate at the plate of tube V5G. This requires, therefore, that the "G" gate be properly provided for each received pulse. Also, it is apparent from FIG. 8A that the generation of the "G" gate is, in effect, dependent upon the prior generation of the "V" gate. Therefore, the appearance of the pulses at the plate of tube V6G is also an indication that successive "V" gates are also being properly generated. In other words, any defect in any of the gate generating circuits which would result in a failure of the "V" gate pulses to be generated would more than likely also result in a failure to generate the "G" gate pulses as well.

Any circuit fault which prevents relay RV from being normally in a picked-up position, such as a failure of tube V7V to conduct, is also detected by this check circuit since it will cause relay RT to be energized through the back contacts 150 and 151 of relays RG and RV, respectively This check on the ability of tube V7V to conduct also checks tube V7G as well. This results from connecting the filaments of these tubes in series as shown in FIG. 7 so that a failure in the filament of tube V7G will also render tube V7V nonconductive ordinarily and thus provide an indication of the defect in the manner just described.

From this description it is apparent that the check circuit provided herein will give a distinctive indication of a defective condition whenever a defect occurs in substantially any portion of the vehicle detection apparatus.

MODIFICATION OF FIG. 9

The FIG. 7 shows a plurality of vehicle detection units employing the single timing relay RT; but it should be understood that in some instances where there are a plurality of detector units the conditions may be such as to make it desirable to have a separate timing relay for each separate detection unit. It also may be desirable to have separate indication lamps and hold magnets H.

Figure 9:
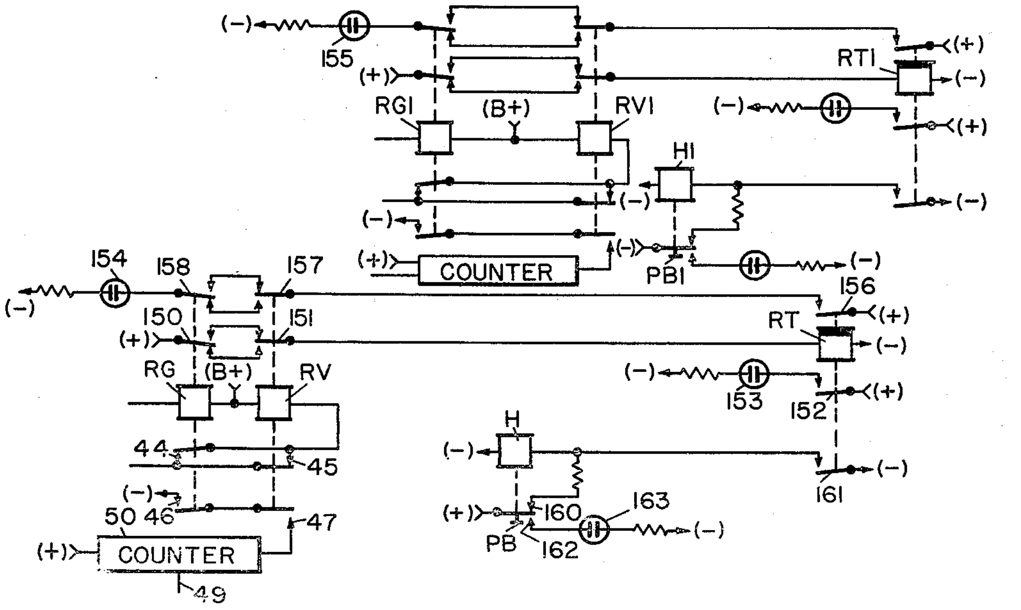
FIG. 9 is a modification of the circuit diagram of FIG. 7 illustrating that the check circuits for each of a plurality of detection units may be independent of each other.

Referring to FIG. 9, it will be seen that the detection relays RG and RV have associated therewith the timing relay RT in exactly the same manner as shown in FIG. 7; while the detection relays RG1 and RV1 have their own timing relay RT1. Also, the hold magnet H1 is associated with a separate push button PB1.

It will thus be seen that the apparatus effecting the checking features above described may be exactly the same for each of a plurality of detection units.

Having described an improved system for the detection of vehicles or other randomly occurring objects, we desire it to be understood that various modifications, adaptations, and alterations may be made to the specification form shown without in any manner departing from the spirit or scope of this invention.

What we claim is:

1. In an object detection system of the kind in which discrete pulses of energy are repetitively beamed across the path to be traversed by said objects and are reflected back toward receiving means from the reflecting surfaces of said objects when they are present but are instead reflected from a fixed reflecting surface more distant than said reflecting surfaces when no object is present, the improvement which comprises, first means being normally maintained in a first condition by the reception by said receiving means of said reflected pulses from said fixed reflecting surface when no object is present but being operated to a second condition when an object is present which prevents said pulses from impinging upon said fixed reflecting surface, second means being operated from a first normal condition to a second condition only when said receiving means receives pulses reflected from said reflecting surfaces of an object means governed jointly by said first and second means for indicating the passage of an object through said detection zone, and check means being jointly controlled by said first and second means to give a distinctive indication of a circuit defect only when said first means and said second means are in said first condition and second condition respectively for longer than a predetermined interval and alternatively said first and second means are in said second and said first conditions respectively for longer than said predetermined interval.

2. The system according to claim 1 wherein said pulses of energy are sound pulses and said first means and said second means comprise first and second electromagnetic relays respectively.

3. The system of claim 2 wherein said first relay is picked-up when in its said second condition and is dropped away to its said first condition in response to said reflected pulses from said fixed reflecting surface, said second relay is in a picked-up condition when in its said first normal condition and is dropped away when in its said second condition in response to the reception by said receiving means of pulses reflected from said reflecting surfaces of an object.

4. The system according to claim 3 wherein said check circuit means includes electromagnetic means having a first energizing circuit including in series the front contacts of said first and second relays and also a second energizing circuit including in series the back contacts of said first and second relays.

5. The system according to claim 4 wherein said check circut means is operated to give said distinctive indication only after being energized substantially continuously for a period of several minutes.

6. In a system for the detection of vehicles as they intercept a beam of sound pulses normally impinging only in the absence of a vehicle upon a fixed reflecting surface, the combination comprising, transmitting means for transmitting said beam, receiving means being responsive to and providing separate first and second input signals corresponding respectively to reflections of said sound pulses from said fixed reflecting surface and from the sound reflecting surfaces of each passing vehicle, first means being operated to a distinctive condition by the continued occurrence of said first output signal, second means being operated to a distinctive condition by the continued occurrence of said second output signal, and check circuit means being distinctively controlled to indicate the existence of a defective condition except when only one of said first and second means is in its said distinctive condition.

7. The combination of claim 6 which further includes indicator means, manually operable means for operating said indicator means to a first condition, means for maintaining said indicator means in said first condition when once operated thereto by said manually operable means, means governed by said check circuit means when said check circuit means has been distinctively controlled to operate said indicator means to a second condition, and means governed by said indicator means when in said second condition to indicate that a fault has occurred in said system, whereby said indication of the occurrence of a fault is continuously given until said manually operable means is actuated even though said fault occurred only momentarily.

8. In a system for detecting the presence of vehicles moving along respectively different defined paths and intercepting correspondingly different beams of sound pulses each directed across a respective path and impinging when no vehicle is present upon a corresponding fixed sound reflecting surface, the combination comprising, a plurality of transmitting means each transmitting a respective beam of pulses, or plurality of receiving means one corresponding to each sound beam and each adapted to provide distinctive first and second output signals in response to reflected sound pulses received respectively from said fixed reflecting surface and from a vehicle intercepting said beam, each said receiving means including a first electromagnetic relay being operated to a distinctive condition by the continued occurrence of said first output signal from said receiving means and also including a second electromagnetic relay being operated to a distinctive condition by the continued occurrence of said second output signal from said receiving means, check means common to all said receiving means and having a plurality of control circuits therefor, each including contacts of said first and second electromagnetic relays of a respective one of said receiving means and each controlling said means to a distinctive fault indicating condition except when only said first or said second electromagnetic relay included in the corresponding receiving means is in its said distinctive condition, and a plurality of defect indicating means one for each receiving means and each being distinctively controlled to indicate a defect in the corresponding receiving means or alternatively the absence of the corresponding beam when said check means is controlled to said distinctive fault indicating condition and when both or neither said first and second electromagnetic relays of the corresponding receiving means is in its said distinctive condition.

9. In a system for detecting the presence of a vehicle within a detection zone defined by a beam of energy directed across the vehicle's path and being reflected from a reflecting surface of said vehicle when it intercepts said beam but being reflected instead from another reflecting surface more distant than said vehicle reflecting surface when said vehicle is not within said beam, transmitting means for transmitting said beam of energy receiving means including first means being operated from its normal condition only by reception of said reflected energy from said vehicle and also including second means being operated from its normal condition only by reception of said reflected energy from said another reflecting surface, means controlled jointly by said first and second means for giving a distinctive indication of the presence of said vehicle in said detection zone, and check means governed jointly by said first and second means to indicate a failure in operation of said system when both said means are in their said normal condition or are both operated from said normal condition concurrently for a time interval in excess of some pre-determined maximum time.

10. Apparatus for detecting the presence of an object within a pre-determined detection zone comprising, energy transmitting means for transmitting energy in a direction causing it to impinge upon each said object during the time it is within said detection zone, energy receiving means, said energy transmitting means and said energy receiving means each including transducer means being so positioned and directed relative to each other and to said object when in said detection zone that said receiving means receives at least a portion of said transmitted energy over a first path when said object is not within said detection zone and over a second different path when said object is within said detection zone, said energy receiving means including first means responsive to said energy received over said first path but not to energy received over said second path and also including second means being responsive to energy received over said second path but not to energy received over said first path, output means governed jointly by said first and second means and being distinctively controlled to indicate the passage of an object through said detection zone only when said second means has been responsive for a time to said energy received over said second path and said first means thereafter again becomes responsive to said energy received over said first path at a time when said second means is no longer responsive, and checking means for said system governed jointly by said first and second means and being controlled to give an indication as to improper operation of said system when neither or both of said first and second means are concurrently responsive for a time interval in excess of some pre-determined maximum time.

11. The detection apparatus of claim 10 wherein said energy comprises repetitive sound pulses, said means included in each of said energy transmitting means and energy receiving means comprises an electro-acoustic transducer, said sound pulses in traveling over said first path travel from said transmitting transducer to a fixed reflecting surface more distant than a vehicle traveling through said detection zone and thence back to said receiving transducer, said sound pulses when traveling over said second path travel from said transmitting transducer to a sound reflecting surface of said vehicle in said detection zone and thence back to said receiving transducer, said energy receiving means includes timing circuit means for differentiating between sound pulses received respectively over said first and second paths to thereby control said first and second means to be responsive respectively only to energy received over said different first and second paths.

12. In a vehicle detection system of the type in which a beam of energy is transmitted across the path of said vehicle and is reflected from said vehicle when it passes through said beam and is alternatively reflected from a different reflecting surface upon which said energy can impinge only when said vehicle is not within said beam of energy the combination comprising, transmitting means for transmitting said beam of energy, receiving means for receiving and differentiating between the energy reflected from said vehicle and also the energy reflected from said different reflecting surface, output means governed by said receiving means for indicating the presence of a vehicle in said beam of energy, and checking means being governed by said receiving means to a distinctive condition indicative of a fault in said system when no reflected energy is received by said receiving means for at least some pre-determined time interval.

References Cited in the file of this patent

UNITED STATES PATENTS

| | | |
|---|---|---|
| 2,403,527 | Hershberger | July 9, 1946 |
| 2,622,140 | Muller | Dec. 16, 1952 |
| 2,917,732 | Chase | Dec. 15, 1959 |